US007961817B2

(12) United States Patent
Dong et al.

(10) Patent No.: US 7,961,817 B2
(45) Date of Patent: Jun. 14, 2011

(54) AC COUPLING CIRCUIT INTEGRATED WITH RECEIVER WITH HYBRID STABLE COMMON-MODE VOLTAGE GENERATION AND BASELINE WANDER COMPENSATION

(75) Inventors: Yikui (Jen) Dong, Cupertino, CA (US); Cathy Ye Liu, San Jose, CA (US); Freeman Yingquan Zhong, San Ramon, CA (US); Shao Ming Hsu, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1224 days.

(21) Appl. No.: 11/634,671

(22) Filed: Dec. 6, 2006

(65) Prior Publication Data
US 2008/0063091 A1 Mar. 13, 2008

Related U.S. Application Data (60) Provisional application No. 60/843,305, filed on Sep. 8, 2006.

(51) Int. Cl.
*H04L 25/06* (2006.01)
*H04L 25/10* (2006.01)

(52) U.S. Cl. ....... 375/317; 375/233; 375/319; 333/28 R; 327/307

(58) Field of Classification Search .................. 375/233, 375/317, 319; 333/28 R; 327/307
See application file for complete search history.

(56) References Cited

U.S. PATENT DOCUMENTS

| 4,471,399 | A | 9/1984 | Udren |
| 4,625,320 | A | 11/1986 | Butcher |
| 4,764,984 | A | 8/1988 | Franke et al. |
| 4,953,041 | A | 8/1990 | Huber |
| 5,107,379 | A | 4/1992 | huber |
| 5,124,673 | A | 6/1992 | Hershberger |
| 5,200,750 | A | 4/1993 | Fushiki et al. |
| 5,227,795 | A | 7/1993 | Yamakido et al. |
| 5,302,860 | A | 4/1994 | Fischer et al. |

(Continued)

OTHER PUBLICATIONS

Sommer et al., "Analysis of the probability distribution of the baseline wander effect for baseband PAM transmission with application to gigabit ethernet", Proceedings of the 11$^{th}$ IEEE International Conference on Electronics, Circuits and Systems 2004, pp. 89-92.

(Continued)

*Primary Examiner* — Shuwang Liu
*Assistant Examiner* — Sung Ahn
(74) *Attorney, Agent, or Firm* — Yee & Associates, P.C.

(57) ABSTRACT

In a receiver, an AC-coupling solution uses a fully integrated circuit for simultaneously providing both baseline wander compensation and common-mode voltage generation. Usefully, an integrated capacitor is placed between the receiver input pin and the input buffer, and a high resistive impedance element is connected to the internal high-speed data node after the capacitor. An on-chip voltage generation and correction circuit is connected to the other side of the impedance element to generate a common-mode voltage, and to provide dynamic, fine adjustment for the received data voltage level. The voltage correction circuit is controlled by the feedback of data detected by the clock and data recovery unit (CDRU) of the receiver. The feedback data passes through a weighting element, wherein the amount of feedback gain is adjustable to provide a summing weight and thereby achieve a desired BLW compensation. Register bits are used to control an on-chip reference voltage generator that consists of a resistor ladder to generate the reference voltage.

19 Claims, 5 Drawing Sheets

U.S. PATENT DOCUMENTS

| | | | |
|---|---|---|---|
| 5,426,389 | A | 6/1995 | Webster |
| 5,465,272 | A | 11/1995 | Smith |
| 5,581,387 | A | 12/1996 | Cahill |
| 5,699,386 | A | 12/1997 | Measor et al. |
| 5,708,389 | A | 1/1998 | Gabara |
| 5,790,064 | A | 8/1998 | Fujimori |
| 5,790,295 | A | 8/1998 | Devon |
| 5,844,439 | A | 12/1998 | Zortea |
| 5,914,982 | A | 6/1999 | Bjarnason et al. |
| 5,940,442 | A | 8/1999 | Wong et al. |
| 5,949,819 | A | 9/1999 | Bjarnason et al. |
| 5,978,417 | A | 11/1999 | Baker et al. |
| 6,005,500 | A | 12/1999 | Gaboury et al. |
| 6,047,026 | A | 4/2000 | Chao et al. |
| 6,121,118 | A | 9/2000 | Jin et al. |
| 6,211,716 | B1 | 4/2001 | Nguyen et al. |
| 6,262,993 | B1 | 7/2001 | Kirmse |
| 6,275,087 | B1 | 8/2001 | Dehghan |
| 6,304,615 | B1 | 10/2001 | Webster |
| 6,324,232 | B1 | 11/2001 | Mirfakhraei |
| 6,362,757 | B1 | 3/2002 | Lee et al. |
| 6,408,032 | B1 | 6/2002 | Lye et al. |
| 6,415,003 | B1 | 7/2002 | Raghavan |
| 6,463,108 | B1 | 10/2002 | Shakiba |
| 6,496,889 | B1 | 12/2002 | Perino et al. |
| 6,501,792 | B2 | 12/2002 | Webster |
| 6,504,849 | B1 | 1/2003 | Wang et al. |
| 6,618,436 | B2 | 9/2003 | Greiss et al. |
| 6,625,124 | B1 | 9/2003 | Fan et al. |
| 6,643,269 | B1 | 11/2003 | Fan et al. |
| 6,647,428 | B1 | 11/2003 | Bannai et al. |
| 6,680,912 | B1 | 1/2004 | Kalman et al. |
| 6,717,956 | B1 | 4/2004 | Fan et al. |
| 6,747,580 | B1 | 6/2004 | Schmidt |
| 6,822,987 | B2 | 11/2004 | Diaz et al. |
| 6,865,149 | B1 | 3/2005 | Kalman et al. |
| 6,885,090 | B2 | 4/2005 | Franzon et al. |
| 6,927,490 | B2 | 8/2005 | Franzon et al. |
| 6,973,107 | B2 | 12/2005 | Diaz et al. |
| 7,589,649 | B1 * | 9/2009 | Aga et al. .................. 341/118 |
| 2002/0021165 | A1 * | 2/2002 | Hwang et al. .................. 329/306 |
| 2002/0021767 | A1 | 2/2002 | Greiss et al. |
| 2002/0084717 | A1 | 7/2002 | Murphy |
| 2002/0085303 | A1 | 7/2002 | Murphy et al. |
| 2002/0096969 | A1 | 7/2002 | Murphy |
| 2002/0113689 | A1 | 8/2002 | Gehlot et al. |
| 2003/0031126 | A1 | 2/2003 | Mayweather et al. |
| 2003/0144011 | A1 | 7/2003 | Richards et al. |
| 2003/0217326 | A1 | 11/2003 | Dati et al. |
| 2004/0008890 | A1 | 1/2004 | Clark et al. |
| 2004/0052528 | A1 | 3/2004 | Halgren et al. |
| 2004/0071346 | A1 | 4/2004 | Clark et al. |
| 2004/0096022 | A1 | 5/2004 | Zhang |
| 2004/0113685 | A1 | 6/2004 | Abidin et al. |
| 2004/0130816 | A1 | 7/2004 | Feyh |
| 2004/0136411 | A1 | 7/2004 | Hornbuckle et al. |
| 2004/0213274 | A1 | 10/2004 | Fan et al. |
| 2005/0002570 | A1 | 1/2005 | Clark et al. |
| 2005/0030985 | A1 | 2/2005 | Diaz et al. |
| 2005/0198674 | A1 | 9/2005 | Lin et al. |
| 2005/0218994 | A1 | 10/2005 | Guckenberger et al. |
| 2005/0238014 | A1 | 10/2005 | Kang |
| 2005/0249295 | A1 * | 11/2005 | Payne et al. .................. 375/257 |
| 2005/0271101 | A1 | 12/2005 | Diaz et al. |
| 2008/0012642 | A1 * | 1/2008 | Cranford et al. .............. 330/258 |
| 2008/0057900 | A1 * | 3/2008 | Fang et al. .................... 455/296 |

OTHER PUBLICATIONS

Gabara et al., "Capacitive Coupling and Quantized Feedback Applied to Conventional CMOS Technology", 1997 IEEE Journal of Solid-State Circuits, vol. 32, No. 3, Mar. 1997, pp. 419-427.

Everitt et al., "A CMOS Transceiver for 10-Mb/s and 100-Mb/s Ethernet", IEEE Journal of Solid State Circuits, vol. 33, Issue 12, Dec. 1998, pp. 2169-2177.

Shoval et al., A CMOS Mixed-Signal 100 Mb/s Receive Architecture for Fast Ethernet, Proceedings of the IEEE Custom Integrated Circuits, May 1999, pp. 253-256.

Baek et al., "Efficient digital baseline wander algorithm and its architecture for fast Ethernet", IEEE Workshop on Signal Processing Systems, 2004, SIPS 2004, pp. 136-141.

Shang et al., "A Technique for DC-Offset Removal and Carrier Phase Error Compensation in Integrated Wireless Receivers", Proceedings of the 2003 International Symposium on Circuits and Systems, ISCAS '03, vol. 1, pp. I-173-178.

Namgoong, DC-Offset and 1/f Noise Effects on AC-Coupled Direct-Conversion Receiver, Proceedings of the $44^{th}$ IEEE 2001 Midwest Symposium on Circuits and Systems, vol. 2, Aug. 2001, pp. 886-889.

Namgoong et al., "Noise Figure of Digital Communication Receivers—Revisited", Transactions on Circuits and Systems I: Regular Papers, IEEE, vol. 51, Issue 7, Jul. 2004, pp. 1330-1335.

Rochelle et al., "Fully Integrated Current-Mode CMOS Gated Baseline Restorer Circuits", Nuclear Science Symposium and Medical Imaging Conference, 1994, IEEE vol. 1, pp. 39-43.

Harjani et al., "DC-Coupled IF Stage Design for a 900-MHz ISM Receiver", IEEE Journal of Solid-State Circuits, vol. 38, Issue 1, Jan. 2003, pp. 126-134.

Hull et al., "A Direct-Conversion Receiver for 900MHz (ISM Band) Spread-Spectrum Digital Cordless Telephone", Solid-State Circuits Conference, 1996, Digest of Technical Papers, $43^{rd}$ ISSCC, pp. 344-345, 470.

Lindquist et al., "A New Approach to Eliminate the DC Offset in a TDMA Direct Conversion Receiver", 1993 IEEE $43^{rd}$ Vehicular Technology Conference, May 1993 pp. 754-757.

Hsu et al., "An AC-Coupled Direct-Conversion Receiver for Global Positioning System", IEEE International Symposium on Circuits and Systems, May 2005, vol. 4, pp. 3235-3238.

Ebadi et al., "The Application of Complex Quantized Feedback in Integrated Wireless Receivers", IEEE Transactions on Circuits and Systems I, vol. PP, Issue PP, 2005, pp. 1-9.

Daak et al., Isolated Capacitively Coupled MOS Driver Circuit with Bidirectional Signal Transfer, 1998 IEEE, pp. 1208-1213.

Sloane et al., "A Zador-Like Formula for Quantizers Based on Periodic Tilings", Jul. 2002, pp. 1-8.

Waldhauer, "Quantized Feedback in an Experimental 280-Mb/s Digital Repeater for Coaxial Transmission", IEEE Transactions on Communications, vol. COM-22, No. 1, Jan. 1974, pp. 1-5.

Shoaei et al., "A 3V Low-Power 0.25um CMOS 100 Mb/s Receiver for Fast Ethernet", 2000 IEEE International Solid-State Circuits Conference, pp. 1-3.

Roo et al., "A CMOS Transceiver Analog Front-End for Gigabit Ethernet over CAT-5 Cables", 2001 IEEE International Solid-State Circuits Conference, pp. 310-311, 458-459.

Mick et al., "4 Gbps High-Density AC Coupled Interconnection", IEEE 2002 Custom Integrated Circuits Conference, pp. 133-140.

Maillard et al., "An 8-Gb/s Capacitively Coupled Receiver With High Common-Mode Rejection for Uncoded Data", IEEE Journal of Solid-State Circuits, vol. 39, No. 11, Nov. 2004, pp. 1909-1915.

Kandlikar et al., "Analysis of Quantized Feedback Low-Frequency Restoration in Digital Regenerators", IEEE Transactions on Communications, vol. 38, No. 8, Aug. 1990, pp. 1118-1120.

Kim et al., "A 5.6-mW 1-Gb/s/pair Pulsed Signaling Transceiver for a Fully AC Coupled Bus", IEEE Journal of Solid-State Circuits, vol. 40, No. 6, Jun. 2005, pp. 1331-1340.

Gabara et al., "Forming Damped RLC Parasitic Circuits in Simultaneously Switched CMOS Output Buffers", IEEE Journal of Solid-State Circuits, vol. 32, No. 3, Mar. 1997, pp. 407-418.

Baek et al., "Novel Digital Signal Processing Unit for Ethernet Receiver", IEEE Symposium on Circuits and Systems, 2005, ISCAS 2005, vol. 5 pp. 4477-4480.

Kelly et al., "A Mixed-Signal DFE/FFE Receiver for 100Base-TX Applications", 2000 IEEE International solid-State Circuits Conference, pp. 1-2/.

Bu et al., A Gain Control Baseline Circuit of the Analog Front-end Circuit for the 1000Base-T Ethernet Transceiver, 2003 IEEE pp. 540-543.

* cited by examiner

| Setting | Values (v) |
|---|---|
| 0 | 0.2 |
| 1 | 0.2267 |
| 2 | 0.2533 |
| 3 | 0.28 |
| 4 | 0.3067 |
| 5 | 0.333 |
| 6 | 0.36 |
| 7 | 0.3867 |
| 8 | 0.4133 |
| 9 | 0.44 |
| 10 | 0.4667 |
| 11 | 0.4933 |
| 12 | 0.52 |
| 13 | 0.5467 |
| 14 | 0.5733 |
| 15 | 0.6 |

FIG. 5 ated AC Coupling Circuit with Hybrid Stable Common Mode Generation and Zero Load Kick Back Immune Baseline Wander Compensation" which application is hereby incorporated herein by reference.

AC COUPLING CIRCUIT INTEGRATED WITH RECEIVER WITH HYBRID STABLE COMMON-MODE VOLTAGE GENERATION AND BASELINE WANDER COMPENSATION

This application claims the benefit of provisional patent application Ser. No. 60/843,305 filed on Sep. 8, 2006, and entitled "Fully Integrated AC Coupling Circuit with Hybrid Stable Common Mode Generation and Zero Load Kick Back Immune Baseline Wander Compensation" which application is hereby incorporated herein by reference.

BACKGROUND OF THE INVENTION

1. Technical Field

The present invention relates generally to the field of data transmission and more particularly to circuits for on-chip AC coupling, stable common-mode voltage generation and baseline wander compensation for high-speed receivers. The invention can provide a full suite AC coupling solution including AC coupling, common mode generation, and baseline wander compensation. The solution can be fully integrated, meaning it is all on-chip, does not require any off-chip components, and meets the stringent requirements of preceding a DFE based high-speed transceiver.

2. Description of the Related Art

In high-speed transceiver design, AC coupling in the channel between the transmitter and the receiver connection is typically preferred and is often required for the functioning of the transmission link. This is particularly true for decision feedback equalization (DFE) based receivers. The DFE receiver operates as a nonlinear equalizer, and is effective to recover data that have been severely damaged by channel loss, reflections and high-frequency crosstalk. Such receivers are particularly useful in high speed backplane transceivers of 6 Gbps and beyond, especially for challenging applications that involve long-range legacy channels. A DFE receiver functions by subtracting the inter-symbol interference (ISI) arising from previously detected data from data that is being currently received. A receiver of this type is susceptible to noise and fluctuations in the DC and low frequency contents of the signal. AC coupling is an effective way of removing the ineluctable common-mode voltage mismatch and the low frequency disturbance. Such coupling insulates the DFE receiver from the channel, and allows for separate receiver common-mode voltage optimization from the transmitter.

One phenomenon that is a problem in an AC coupled system is baseline wander (BLW), which is signal dependent and varies over time. BLW affects the low frequency contents of the received signal and can cause errors in the detected data. The baseline wander is even more severe for an on-chip AC coupled system. This is due to the high AC coupling corner frequency resulting from the small devices that can be afforded on-chip.

The BLW in an on-chip AC coupled system must be mitigated for reliable link functioning. In the prior art, baseline wander compensation can be partitioned into the following major categories: DSP (digital signal processing) based; adaptive equalizer based; peak-detector based; and quantized feedback methods.

Digital BLW compensators, exemplified by U.S. Pat. No. 6,415,003, cancel baseline wander effects in the digital domain. The entire signal processing including the BLW compensation and the equalization are done by DSP algorithms. A high-resolution ADC is required to detect the tiny BLW change over time. This type of compensator is not practical for multi-Gbps transceivers using current CMOS technology, due to the unrealistic simultaneous requirements of ultra high-speed and high-resolution ADC.

The adaptive equalizer based BLW compensator, exemplified by U.S. Pat. No. 6,047,026, treats the baseline wander as a common source of ISI, and uses adaptive FIR or IIR filters to cancel BLW. For the FIR case, this type of compensator would require a large number of filter taps, that may be on the order of thousands, to track the tiny slowly varying baseline change. One solution to this problem is to use an IIR unit inside the DFE FIR filter to deal with the BLW. However, the BLW correction interacts and brings difficulty to the DFE adaptation loop. Both methods are not suitable for high-speed transceivers because of associated cost or interference.

The peak-detector based BLW compensators, exemplified by U.S. Pat. No. 5,940,442, are based on the assumption that the baseline wander is the dominating source of error. The amount of baseline wander is controlled by detecting the peak pulse against a predetermined threshold voltage, and subtracting the low-pass filtered version of the pulse. The scheme works well on equalized data. But when large amount of channel-limiting ISI coexist, the nonlinearly subtracted feedback peak-currents includes both the BLW and the channel-limiting ISI information. As a result, the ISI can not be linearly passed to the next stage, and is permanently damaged for DFE. These compensators are not suitable for our application.

Quantized feedback theory for baseline wander compensation is well known and is exemplified by U.S. Pat. No. 5,699,386. However, previous arts in this category are limited to simple circuits, wherein little signal processing is done between the AC coupling corner and the quantization device. Critical circuit issues such as stable common-mode voltage maintenance, mitigation of high-frequency feed-through from the quantized feedback, and prevention of excess current and capacitive loading from the baseline restoration circuit are not addressed.

When implementing a BLW correction circuit in the signal path before a DFE receiver, a number of design considerations preclude the use of existing methods such as those referred to above. These design considerations include the following:

1) A well defined common-mode voltage is needed before the DFE. The common-mode voltage has fundamental impact on the key performance measures of an analog circuitry, including linearity, bandwidth, signal-swing and many others. The DFE functions only when the transistors are biased in the saturation region. The common-mode voltage (Vcm) has to be stable, to guarantee consistent performance and maintain the dynamic range.

2) The clock feed-through or kick-back noise from the BLW correction circuit to the high-speed signal path needs to be mitigated. This is even more critical if DFE is used. If unprotected, the high frequency noise appears as jitter and distortion, and damages the data for proper DFE.

3) The current loading to the high-pass filter output node has to be well controlled. In a high-speed SERDES, the clock is recovered from the received data. The high-pass filter corner frequency has to be sufficiently low in order to pass through enough information to set up the timing loop before the BLW loop setup. The high-pass transfer function is given by $H_{hp}(s)=sRC/(1+sRC)$. With a limited size capacitor available on the chip, the equivalent impedance R has to be large to maintain the corner frequency.

4) The capacitive loading must be minimized, because of the difficult return-loss and bandwidth requirement at multi-Gbps high data rate. The total parasitic budget drops quickly with the increase of the transmission rate. At 6.4 Gb/s, even with the favorite exact resistive matching, it is far from comfortable to accommodate all the essential elements without damage returnloss performance. Zero additional capacitive loading is the prerequisite of BLWC for 6.4 Gb/s+ transceivers. It is desirable for the capacitive loading from the BLW correction circuitry to be exempt from the high-speed signal path.

In view of the above, it would be desirable to offer a complete integrated AC coupling solution for applications of both DC balanced and non-DC balanced transmission. It would also be beneficial to provide a better technique for BLW correction that does not impose clock feed-through to the high-speed data path, and does not add extra capacitive or resistive loading. Moreover, it would be desirable to offer on-chip common-mode voltage generation and maintenance that is not dependent on gain, temperature or other IC process variations.

SUMMARY OF THE INVENTION

The current invention provides an AC coupling solution that uses a hybrid circuit structure for simultaneously providing both baseline wander compensation and common-mode voltage generation and maintenance. Embodiments of the invention are fully integrated, that is, are included in the same IC as the receiver of a transceiver system, such as a high-speed transceiver. In a useful embodiment, an integrated capacitor is placed between the receiver input pin and the input buffer, and a high impedance linear network, such as a single large resistor, is connected to the internal high-speed data node after the capacitor. An on-chip voltage generation and correction circuit is connected to the other side of the high impedance element to generate a common-mode voltage, and to provide dynamic, fine adjustment for the voltage level of received data. This voltage correction circuit is controlled by the feedback of data that is detected by the clock and data recovery unit (CDRU) of the receiver. The feedback data passes through a weighting element, wherein the amount of feedback gain is adjustable to provide a summing weight and thereby achieve a desired BLW compensation. A reference voltage is used to set the common-mode voltage. In one embodiment associated with a receiver having an input signal, a compensation circuit is provided that comprises a first feedback loop. The first feedback loop is adapted to receive a feedback signal, corresponding to data detected from the receiver input signal, and is further adapted to generate a specified correction component in response to the received feedback signal. The circuit further comprises a second feedback loop configured to generate a common-mode voltage that is determined by a reference voltage generator associated with the receiver. A mechanism combines the correction component with the common-mode voltage, in order to provide a reconstructed low frequency component for the receiver input signal.

A fully-integrated AC-coupling circuit with hybrid common-mode voltage (Vcm) generation and BLW compensation is proposed. The on-chip generated Vcm eliminates the requirement of an extra chip-pin and additional board-supply for the common-mode voltage, and offers the maximum freedom for circuit optimization. In addition, the heavy penalty resulted from large by-pass capacitors typically required in conventional on-chip Vcm-generation-circuit is avoided. Additional circuitry is included to cancel the BLW by feedback of the recovered data readily available in the receiver. Unlike the previous methods, the proposed circuit mitigates the contamination to the sensitive high-speed data from the high-frequency kick-back noise inherent to the quantized feedback. It also imposes 'zero' resistive or capacitive loads to the AC-coupling node. These qualities are of primary concern for 6.4 Gb/s+ high-speed transceivers, where the incoming signal is small and highly sensitive to noise and interference, and the difficult return-loss performance critically depends on the total parasitic capacitance seen at the pin. Endorsed by the little resistive loading, low intrinsic AC-coupling corner frequency for clock recovery can be implemented with limited on-chip capacitor. The circuit is particularly useful for compensation of BLW immersed in excess channel-limiting ISI, where most previous methods fail. A data compressor is offered for parallel to single-bit conversion to extend the application to the popular parallel data recovery architectures. A formula is provided to compute the proper BLW feedback gain. With the proposed circuit inside the receiver, both DC and AC-coupled paths can exist simultaneously for the optimal operation of all circuits.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
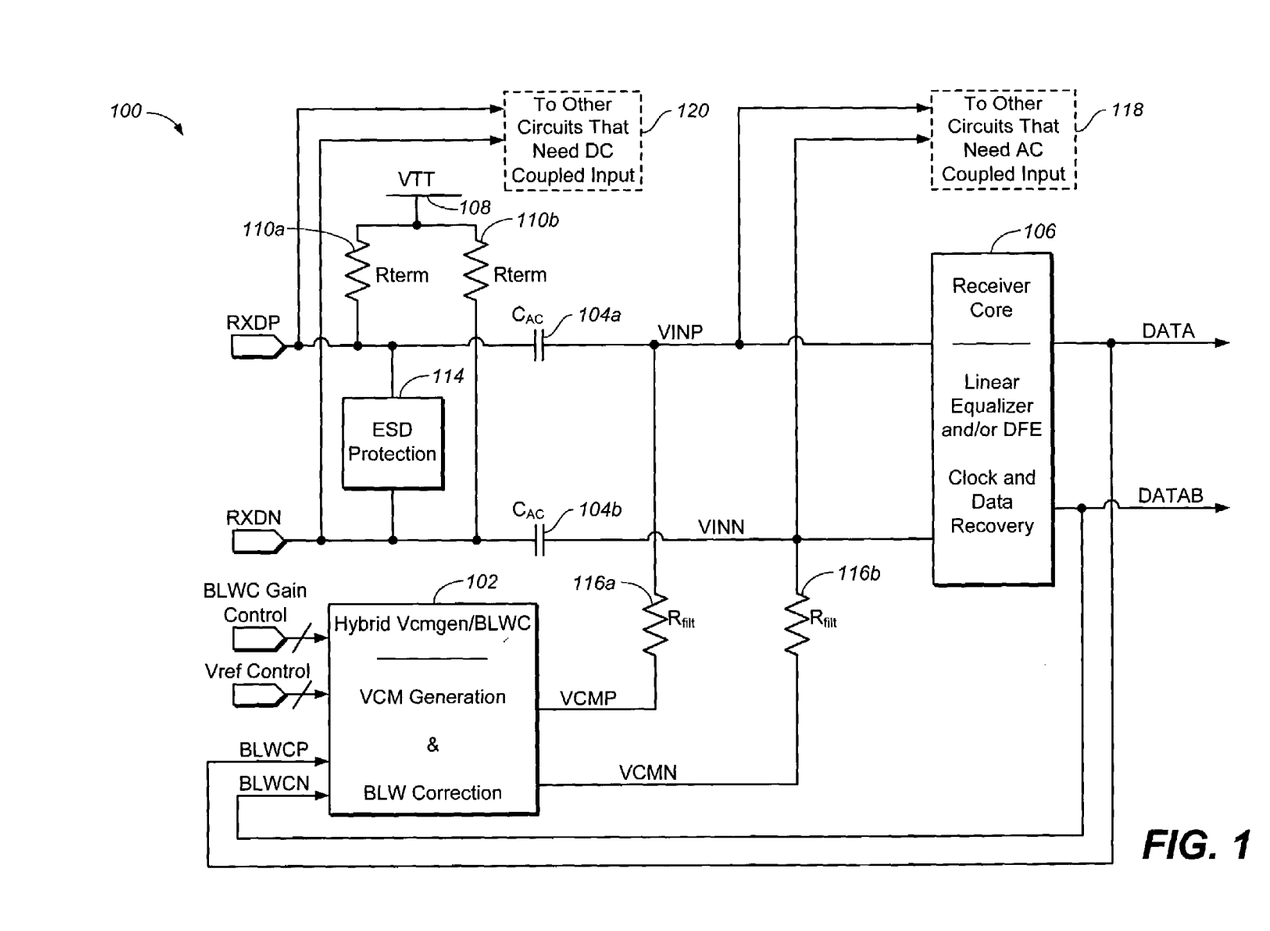
FIG. 1 is a block diagram showing components of a high speed receiver, together with a circuit comprising an embodiment of the invention that is fully integrated with the receiver.

With reference now to FIG. 1, there is shown a block diagram depicting a receiver 100, provided with a circuit 102 comprising an embodiment of the invention. Receiver 100 usefully comprises the receiver in a high speed backplane transceiver, such as a transceiver operating at 6 Gbps or greater, but the invention is not limited thereto. Moreover, all components of receiver 100 including circuit 102 are usefully integrated together on a single chip or IC. As a further feature, the input signal to the receiver, coupled from the transmitter through a transmission channel, usefully comprises a differential input having positive and negative analog voltage components, RXDP and RXDN, respectively, and a common-mode voltage. The input signal is equal to (RXDP−RXDN), and the common-mode voltage associated with the components is (RXDP+RXDN)/2.

Referring further to FIG. 1, there is shown the receiver input signals RXDP/RXDN coupled to an input buffer 106 through capacitors 104a and b, respectively. Thus, the receiver input signal is AC-coupled to buffer 106, so that only the AC components of input signal RXDP/RXDN, comprising Vinp and Vinn, respectively, are connected to input buffer 106. Capacitors 104a and b also substantially diminish the low frequency component of input signal RXDP/RXDN coupled to buffer 106. Buffer 106 is shown to include a clock/data recovery unit (CDRU), and further includes receiver equalizers, such as a linear equalizer, and/or a decision feedback equalizer (DFE). The CDRU detects and recovers both data content and the clock information from the input signal Vinp/Vinn, to thereby provide digital output signal DATA and its complementary DATA_BAR (DATAB), and the associated clock signal CLKOUT. These signals are coupled to additional receiver circuits (not shown) as are required for receiver operation. FIG. 1 also shows buffer 106 provided with a termination voltage 108, termination resistors 110a and 110b, and ESD protection 114.

As discussed above, baseline wander (BLW) is a significant problem in on-chip AC coupled systems, such as receiver system 100 shown in FIG. 1. BLW affects the low frequency contents of the received signal and can cause errors in the detected data. Accordingly, to provide correction for BLW, circuit 102 is coupled to the receiver input, through high impedance linear resistive networks 116a and 116b. As hereinafter described in connection with FIG. 2, circuit 102 is used in producing a reconstructed data signal to cancel effects of baseline wander in the receiver input signal. In addition, circuit 102 is a hybrid circuit that also generates an optimal common-mode voltage for the reconstructed signal. The reconstructed signal includes the differential components Vcmp and Vcmn, which are connected through high impedance resistive networks 116a and 116b, and combined with receiver inputs Vinp and Vinn, respectively. The combined signals thus comprise the complete receiver input signal RXDP/RXDN, wherein the effects of baseline wander have been canceled from such input signal. Also, the common-mode voltage that was removed from the original receiver input signal, by the coupling capacitors 104a and b, is replaced by the optimal common-mode voltage provided by the reconstructed signal.

In the configuration shown by FIG. 1, the input to circuit 102 is provided by signals BLWCP and BLWCN, which are coupled back to circuit 102 from the digital output data signals DATA/DATAB.

FIG. 1 further shows circuits of receiver 100 that need the AC-coupled input signal Vinp/Vinn, collectively represented in FIG. 1 as item 118. Similarly, circuits of receiver 100 that need the DC-coupled input signal RXDP/RXDN are collectively represented in FIG. 1 as item 120. As further discussed hereinafter, by placing the capacitor 104 within or integral to receiver 100, the need for a capacitor external to the IC containing receiver 100, in order to provide AC-coupling to the receiver input signal, is eliminated.

Figure 2:
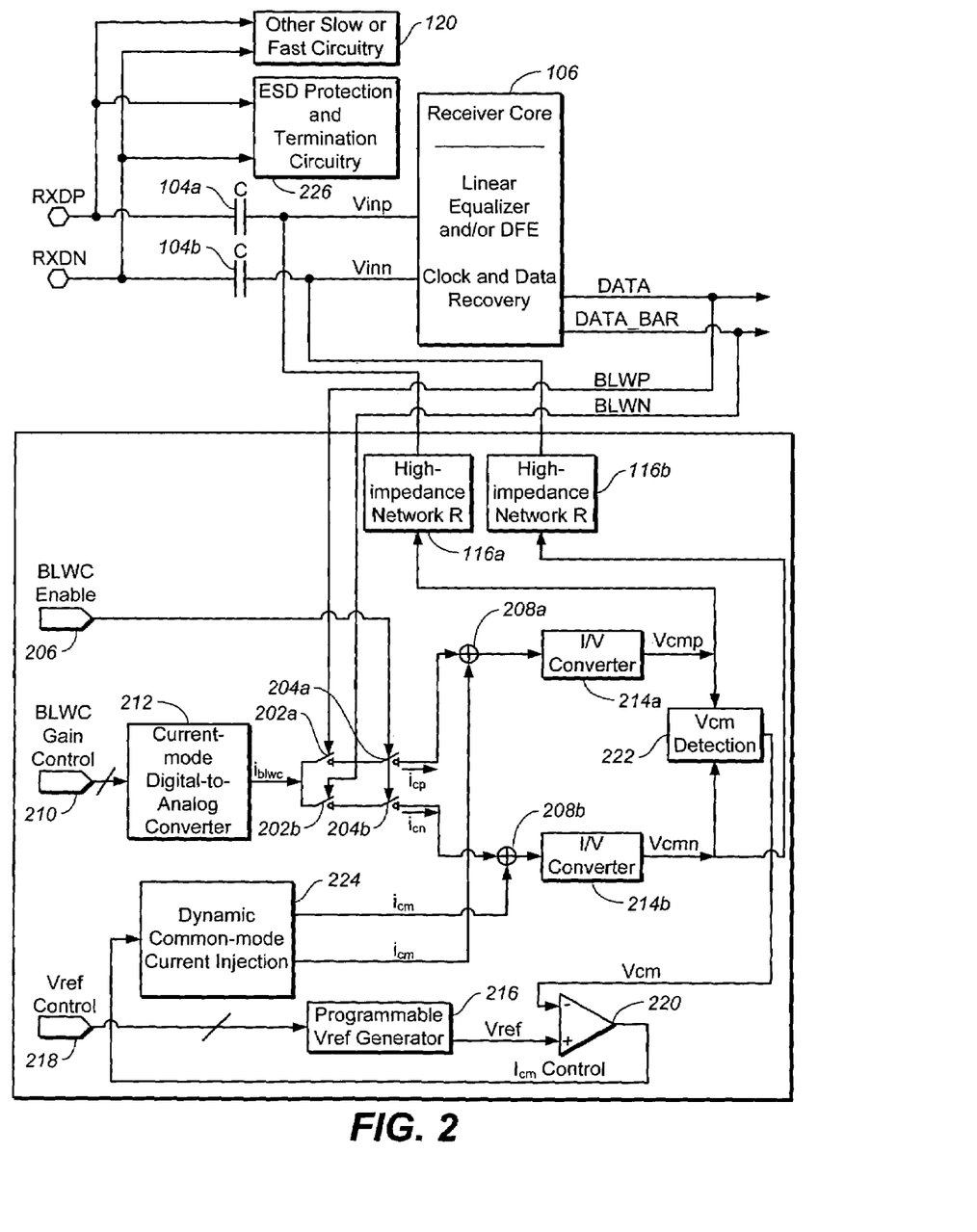
FIG. 2 is a block diagram showing the embodiment of FIG. 1 in greater detail.

Referring to FIG. 2, there is shown a baseline wander correction and voltage generation circuit 200, wherein circuit 200 comprises circuit 102 and the connected impedance networks 116a and 116b, as described above in connection with FIG. 1. Thus, circuit 200 receives the digital feedback signals BLWP and BLWN, as likewise described above. FIG. 2 also collectively represents the components 108, 110a, 110b and 114 of FIG. 1 as ESD Protection and termination circuitry 226.

FIG. 2 further shows digital feedback signal BLWP coupled to operate a switch 202a in circuit 200, so that switch 202a is opened when BLWP is a digital 0 and is closed when BLWP is 1. Switch 202a is connected in series with an enable switch 204a, operated by BLWC enable 206. Thus, when enable switch 204a is closed and BLWP is 1, a current $i_{blwc}$ flows through the switches to a summer 208a. The current $i_{blwc}$ is supplied by a BLWC gain control 210, and coupled through a current-mode digital-to-analog (D/A) converter 212. When BLWP is 0, switch 202a is open and the current $i_{blwc}$ cannot flow. Accordingly, as digital bits of feedback signal BLWP are successively applied to operate switch 202a, a pulsed current $i_{cp}$ flows through switch 202a, wherein the current $i_{cp}$ represents the receiver recovered data content. BLWN is complementary to BLWP. BLWN operates a switch 202b, similar to operation of switch 202a, to provide pulsed current $i_{cn}$.

The low frequency amplitude of the receiver input signal can be corrected for baseline wander effects by applying a BLWC correction gain thereto. The required BLWC correction gain can be determined from the transmitter (TX) amplitude swing and the DC loss of the transmission channel, by the following relationship:

BLW correction gain=TX swing/10^(channel DC loss in dB/20)   Eqn. (1)

Figure 3:
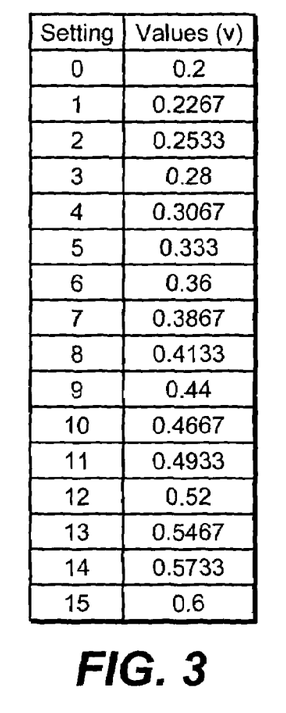
FIG. 3 is a table exemplifying values that may be selected for baseline wander correction gain settings, in the embodiment of FIG. 1.

From Eqn. (1), correction gain values can be computed for use with circuit 200. For example, FIG. 3 comprises a table showing 16 pre-programmed settings for BLW correction gain. In its operation, BLWC gain control 210 selects the gain value from the table that is closest to the BLW correction gain calculated using Eqn. (1). Gain control 210 then generates a current $i_{blwc}$ that is proportional to or otherwise represents the selected gain value. Thus, current $i_{blwc}$ is adapted to compensate for BLW in the receiver input signal.

Referring further to FIG. 2, there are shown summers 208a and 208b adding the currents $i_{cp}$ and $i_{cn}$, respectively, to a current $i_{cm}$, which represents the common-mode voltage as described hereinafter. The combined currents are then converted to voltages Vcmp and Vcmn, by respective current-to-voltage (I/V) converters 214a and 214b. Vcmp is connected through high impedance linear network 116a to receiver input Vinp. Similarly, Vcmn is connected through high impedance linear network 116b to receiver input Vinn. FIG. 2 shows networks 116a and 116b comprising resistors R.

It is thus seen that certain elements of circuit 200, together with buffer 106, form a feedback loop to produce the signal Vcmp/Vcmn. These elements include switches 202a and 202b, switches 204a and 204b, summers 208a and 208b, I/V converters 214a and 214b, and the impedance networks 116a and 116b. Relationships pertaining to the operation of this feedback loop are set forth hereinafter. Moreover, by providing the signal Vcmp/Vcmn with BLW correction gain, and by then combining Vcmp/Vcmn with the input signal Vinp/Vinn, BLW effects in the input signal are corrected or compensated for.

In order to generate the current $i_{cm}$, representing the common-mode voltage, circuit 200 further includes a programmable generator 216, for supplying a reference voltage Vref. Usefully, generator 216 comprises a resistor ladder (not shown) consisting of identical elements. The ladder is connected between the power supply and ground of circuit 200, and has multiple tap points controlled by switches to provide adjustability of the output voltage. Generator 216 is thereby programmable to provide a particular value of Vref, by coupling a digital command thereto through a Vref control 218. The digital command may be supplied by a bit register or the like. The Vref value provided for a particular application is coupled from the Vref generator 216 to an input of a comparator, such as operational amplifier 220.

FIG. 2 further shows a common-mode voltage detection circuit 222 placed between the P and N gain-adjusted feedback paths described above. Detection circuit 222 determines the common-mode voltage between Vcmp and Vcmn, such as by computing the value (Vcmp+Vcmn)/2. This value is applied to comparator 220 as a second input, and is thus compared with reference voltage Vref. Accordingly, the output of comparator 220 represents the difference between Vref and the detected voltage. Such output is used to dynamically adjust a common-mode current injection circuit 224, which produces current $i_{cm}$ coupled to summers 208a and 208b.

It is thus seen that generator 216, comparator 220 and circuits 222 and 224, together with summers 208a and 208b and I/V converters 214a and 214b, form a second feedback loop that maintains a steady common-mode voltage between the voltages Vcmp and Vcmn produced by the first feedback loop, as described above. It is to be emphasized that the common-mode voltage has profound impact on the functioning of an analog circuit. Such voltage affects the linearity, bandwidth, signal swing and many other key performance measures. The on-chip common-mode voltage generation and maintenance provided by circuit 200 eliminates the requirement to have an extra chip pin and additional board power supply for the common-mode of the AC-coupled path. Since the common-mode voltage generated on-chip is programmable and can be set by register bits, it significantly enhances freedom of circuit operation and optimization.

In describing operation of the feedback loops of circuit 200, it is to be understood that $R_{pflt}$ and $R_{nflt}$ are the resistances of high impedance networks 116a and 116b, respectively, where $R_{pflt}=R_{nflt}=R$. $R_p$ and $R_n$ are the respective resistances of I/V converters 214a and 214b, and $R_1$ and $R_2$ are the resistances of detection circuit 222. The following are valid for these resistance values:

$$R_p = R_n \ll R_1 = R_2 \qquad \text{Eqn. (2)}$$

$$R_1 = R_2 \ll R_{nflt} = R_{pflt} \qquad \text{Eqn. (3)}$$

If $C_{PVCM}$ is the parasitic capacitance seen at the voltage node Vcmp and Vcmn, $V_{feedback}$ is reconstructed by BLWCP/BLWCN routed to circuit 200, and $V_{in}$ is the input receiver signal (RXDP−RXDN) before the AC-coupling capacitors 104a and b, then in the frequency domain the complete reconstructed signal V(s) is given by:

$$V(s) \cong \frac{sRC}{1+sRC} Vin + \frac{1}{1+sRC} \cdot \frac{1}{1+sR_p C_{pvcm}} \cdot G \cdot V_{feedback} \qquad \text{Eqn. (4)}$$

In Equation (4) G denotes the feedback gain. Assuming the feedback latency is much smaller than the AC coupling time-constant, and the feedback gain G is tuned to match the Vin low-frequency amplitude, then at steady state the following approximation is true:

$$V(s) \cong \frac{sRC}{1+sRC} Vin + \frac{1}{1+sRC} \cdot \frac{1}{1+sR_p C_{pvcm}} \cdot Vin \qquad \text{Eqn. (5)}$$

Given $R_p \cdot C_{pvcm} \ll R_{nflt} \cdot C_{ac} = RC$;

$$V(s) \cong \frac{sRC}{1+sRC} Vin + \frac{1}{1+sRC} Vin = Vin \qquad \text{Eqn. (6)}$$

Therefore, the high-speed signal V(S) is reconstructed without loss of information.

To emphasize features of the embodiment shown by circuit 200, it is noted that the P and N feedback voltage is first filtered by the low-pass filter formed naturally by the parasitic capacitor and total impedance seen at the node. The corner frequency of this filter is typically several orders higher than the AC coupling corner frequency. It filters the high-frequency noise and jittering from the digital feedback signal and other coupling sources. Then the feedback signal is further heavily low-pass filtered by the high-impedance element and the AC coupling capacitors 104a and 104b, and adds the residual voltage adjustment to the high-speed data line to cancel out the baseline wander accumulation in real time as previously described. The high-pass filtering of the high-speed input signal and the dominant low-pass filtering of the feedback signal enjoys the same corner frequency since they are formed by the same set of circuit elements, that is, capacitors 104a and 104b and high impedance resistive network 116a/116b. The feedback correction voltage is developed locally in the common-mode generation circuitry from current pulses. The high-impedance element 116a/116b is used to connect the correction to the high-speed data line, so that no significant current is drawn. The intrinsic AC coupling corner frequency is related to the time-constant formed by the AC capacitor and the high-impedance element, and can be made low with limited on-chip capacitance. The parasitic capacitance loading from the Vcm generation and BLW cancellation circuit 200 is greatly attenuated by the high-impedance element. The high-speed data line is also immune from the clock-feedthrough or kick-back noise from the digital feedback signal. The kick-back noise is by-passed by the much lower impedance path to the gnd/power supply, and would not traverse the high-impedance path to the highly sensitive high-speed data line.

These qualities are of primary concern for high-speed transceivers of multi-Gbps and beyond, where the received signal is small and highly sensitive to noise and interference, and the difficult return-loss performance is critically dependent on the total parasitic capacitance seen at the pin. The low intrinsic high-pass AC coupling corner frequency is important in the system where the clock has to be recovered from the received data, which is the case for most Gbps Serdes standards.

Besides the features mentioned above, the fully integrated complete AC coupling solution provided by embodiments of the invention offers other important advantages. Compared with external AC coupling, it possible that only a selective set of the circuitries on the receiver are AC coupled. DC coupled paths could coexist by tapping directly to the input pin. As a result, circuit functions that would benefit from DC coupling can be implemented.

Figure 4:
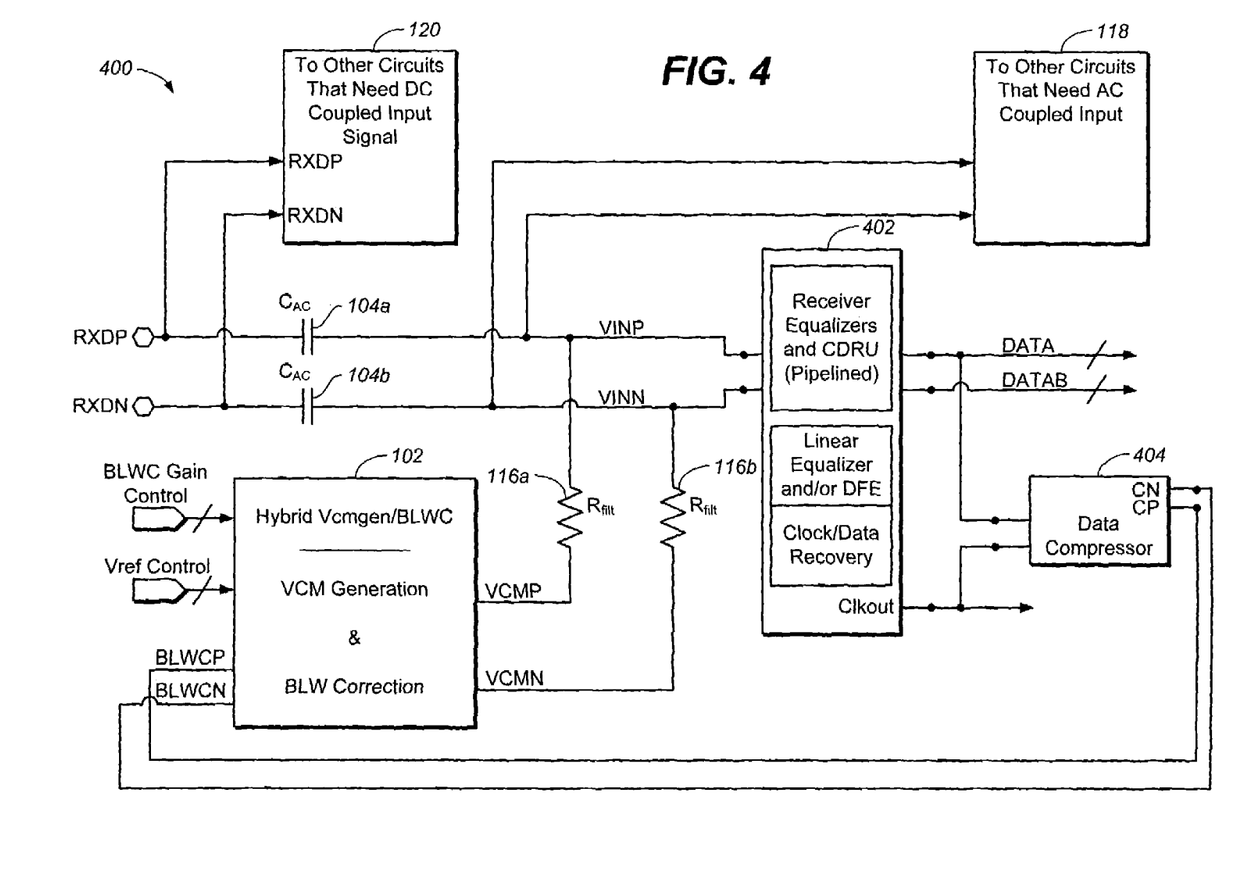
FIG. 4 is a block diagram showing a further embodiment of the invention that uses data compression.

Referring to FIG. 4, there is shown a receiver configuration 400 which includes circuit 102, and is very similar to receiver 100 shown in FIG. 1. However, receiver 400 includes a buffer 402 with receiver equalizers and a CDRU that has a parallel data recovery receiver architecture. Thus, the CDRU provides output data signals DATA and DATAB in parallel multi-bit form, such as the form of four parallel bits. However, feedback signals BLWCP and BLWCN, comprising information content of the signals DATA and DATAB and required for BLW correction, as described above, must be in the form of serialized single bits. This form is necessary, since the feedback content must be converted to analog form by circuit 102, as likewise described above.

Figure 5:
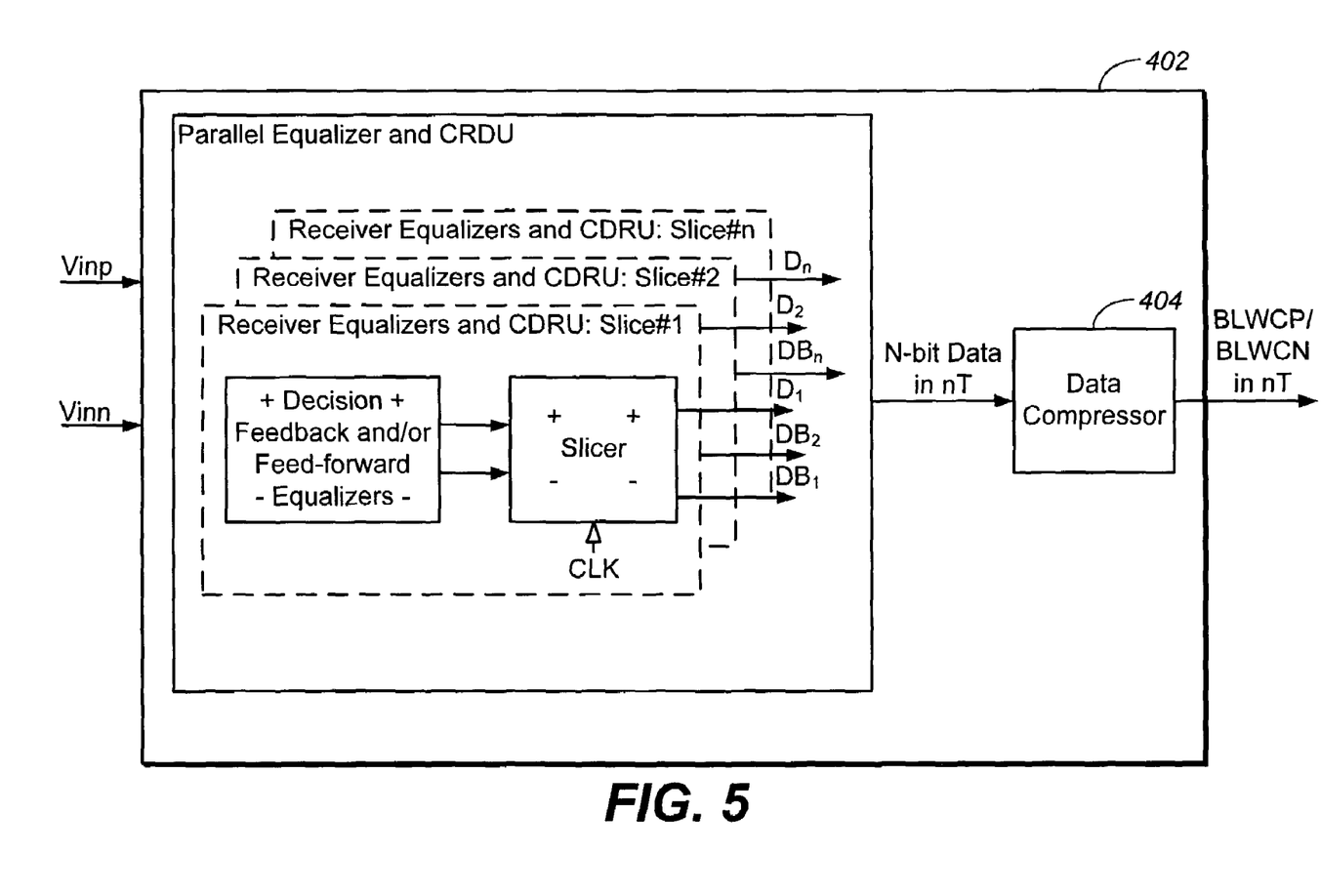
FIGS. 5 and 6 are block diagrams showing respective components for the embodiment of FIG. 4.

Accordingly, FIG. 4 shows a data compressor 404 coupled to receive the N-bit output data signal DATA. Compressor 404 is also shown by FIG. 5, in further detail. The de-serialized N-bit output data is coupled at a frequency n times slower than the input data from the CDRU, and is combined together by data compressor 404 to generate the single-bit feedback data signal BLWCP/N for BLW correction.

Figure 6:
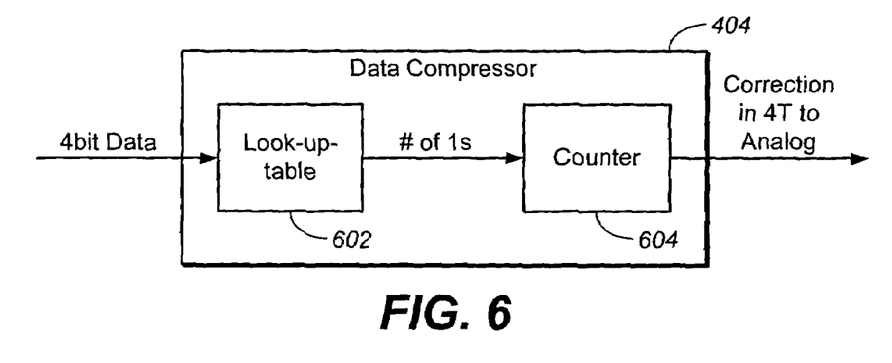

Referring to FIG. 6, there is shown a data compressor implementation example for 4-bit parallel data. The implementation consists of a look-up table 602 and a counter 604, for generating correct data for each 4-bit pattern.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. In association with a receiver configured to receive a first input signal, an input signal compensation circuit comprising:
    a first feedback loop adapted to receive a feedback signal, corresponding to data detected from said first input signal, and further adapted to generate a baseline wander correction component in response to said feedback signal;
    a second feedback loop configured to generate a common-mode voltage related to a selected reference voltage associated with said first input signal;
    a combining mechanism for combining said baseline wander correction component with said common-mode voltage, for use in providing a reconstructed correction component for said first input signal;
    wherein said feedback signal is a digital feedback signal;
    wherein said first feedback loop further comprises one or more switches, wherein each of said switches is operated by said digital feedback signal to generate a pulsed current that represents said feedback signal, and further represents a selected gain adjustment to compensate for baseline wander in said first input signal;
    wherein said combining mechanism includes a summer for combining said pulsed current with a current supplied by said second feedback loop that represents said common-mode voltage; and
    wherein said second feedback loop comprises a comparator and a dynamic common-mode current injection device connected to receive an output of the comparator, and to supply current that represents said common-mode voltage in response to said output of the comparator.

2. The circuit of claim 1, wherein said first input signal is AC coupled to said receiver, and said reconstructed correction component provides compensation for interference comprising baseline wander (BLW).

3. The circuit of claim 2, wherein a selected capacitor element is used to AC couple said first input signal to said receiver, and is also used in a low pass filter operable to provide said feedback signal for said first feedback loop.

4. The circuit of claim 1, wherein said first input signal comprises a differential input having positive and negative components, and an associated common-mode voltage.

5. The circuit of claim 1, wherein said first feedback loop is provided with a BLW compensation gain control to supply a current $i_{blwc}$, wherein the current $i_{blwc}$ is disposed to flow through said switches when said switches are respectively closed by said feedback signal, in order to generate said pulsed current.

6. The circuit of claim 1, wherein the selected reference voltage is connected as a first input to said comparator, and a compensation component is connected as a second input to said comparator, wherein said compensation component is derived using said current combined by said summer.

7. The circuit of claim 1, wherein said receiver includes a data compressor to convert parallel-form data into serial-form data, in order to provide low frequency feedback signal for said first feedback loop.

8. The circuit of claim 1, wherein said receiver comprises a high frequency receiver, and said receiver and the input compensation circuit are respectively integrated into a common integrated circuit.

9. For use in a receiver configured to receive a transmitted input signal affected by baseline wander (BLW) during transmission, a circuit apparatus comprising:
    a first circuit component configured to generate a feedback signal representing data contained in said transmitted input signal;
    a first set of circuit elements operable by said feedback signal to produce a first signal provided with a BLW compensation value;
    a second set of circuit elements for generating a second signal representing a common-mode voltage adaptable to said receiver;
    a second circuit component for producing a reconstructed correction component from said first and second signals, and for combining said reconstructed correction component with said transmitted input signal to compensate said transmitted input signal for BLW effects; and
    said second set of circuit elements comprises a reference voltage generator, a comparator, and a dynamic common-mode current injection device connected to receive an output of the comparator, and to supply current that represents said common-mode voltage in response to said output of the comparator.

10. The apparatus of claim 9, wherein said receiver and said circuit apparatus are contained in a common integrated circuit (IC), and said transmitted input signal is AC-coupled to said receiver by means of a capacitor contained in said common IC.

11. The apparatus of claim 9, wherein said first set of circuit elements comprises a BLW compensation gain control, and one or more switches operable by said feedback signal to generate a pulsed current that represents a selected gain adjustment to compensate for baseline wander in said transmitted input signal.

12. In association with a receiver configured to receive a first input signal, a method comprising the steps of:
    receiving a feedback signal by a first feedback loop, wherein the feedback signal corresponds to data detected from said first input signal;
    generating a baseline wander correction component in response to said feedback signal;
    generating a common-mode voltage related to a selected reference voltage associated with said first input signal using a second feedback loop;
    combining, using a combining mechanism, said baseline wander correction component with said common-mode voltage for use in providing a reconstructed correction component for said first input signal;
    wherein said feedback signal is a digital feedback signal;
    wherein said first feedback loop further comprises one or more switches, wherein each of said switches is operated by said digital feedback signal to generate a pulsed current that represents said feedback signal, and further represents a selected gain adjustment to compensate for baseline wander in said first input signal;
    wherein said combining mechanism includes a summer for combining said pulsed current with a current supplied by said second feedback loop that represents said common-mode voltage; and
    wherein said second feedback loop comprises a comparator and a dynamic common-mode current injection device connected to receive an output of the comparator, and to supply current that represents said common-mode voltage in response to said output of the comparator.

13. The method of claim 12, wherein said first input signal is AC coupled to said receiver, and said reconstructed correction component provides compensation for interference comprising baseline wander (BLW).

14. The method of claim 13, wherein a selected capacitor element is used to AC couple said first input signal to said receiver, and is also used in a low pass filter operable to provide said feedback signal for said first feedback loop.

15. The method of claim 12, wherein said first input signal comprises a differential input having positive and negative components, and an associated common-mode voltage.

16. The method of claim 12, wherein said first feedback loop is provided with a BLW compensation gain control to supply a current $i_{blwc}$, wherein the current $i_{blwc}$ is disposed to flow through said switches when said switches are respectively closed by said feedback signal, in order to generate said pulsed current.

17. The method of claim 12, wherein the selected reference voltage is connected as a first input to said comparator, and a compensation component is connected as a second input to said comparator, wherein said compensation component is derived using said current combined by said summer.

18. The method of claim 12, wherein said receiver includes a data compressor to convert parallel-form data into serial-form data, in order to provide low frequency feedback signal for said first feedback loop.

19. The method of claim 12, wherein said receiver comprises a high frequency receiver, and said receiver and the input signal compensation circuit are respectively integrated into a common integrated circuit.

* * * * *